United States Patent

Satoh et al.

[11] Patent Number: 5,167,311
[45] Date of Patent: Dec. 1, 1992

[54] TRANSMISSION CONTROL SYSTEM WITH GEAR SHIFT FAILURE DETECTION

[75] Inventors: Yuji Satoh; Hiromi Kono; Masuhiro Otsuka; Hiroyuki Soda, all of Saitama, Japan

[73] Assignee: Zexel Corporation, Tokyo, Japan

[21] Appl. No.: 587,354

[22] Filed: Sep. 24, 1990

[30] Foreign Application Priority Data

Sep. 26, 1989 [JP] Japan .................. 1-250037
Sep. 26, 1989 [JP] Japan .................. 1-250038

[51] Int. Cl.⁵ ............................................ B60K 41/28
[52] U.S. Cl. .......................... 192/0.073; 192/0.092; 192/3.58; 74/335; 364/424.1
[58] Field of Search ............. 192/0.073, 0.092, 3.51, 192/3.54, 3.55, 3.58, 3.61, 3.62; 74/335, 336 R; 364/424.1

[56] References Cited

U.S. PATENT DOCUMENTS

| | | | |
|---|---|---|---|
| 4,621,328 | 11/1986 | Arai et al. | 364/424.1 |
| 4,638,690 | 1/1987 | Hattori et al. | 364/424.1 X |
| 4,702,127 | 10/1987 | Cote | 364/424.1 |
| 4,718,307 | 1/1988 | Yabe et al. | 74/335 X |
| 4,766,774 | 8/1988 | Tamai | 74/335 X |
| 4,796,485 | 1/1989 | Ebina | 74/335 X |
| 4,856,360 | 8/1989 | Yoshimura et al. | 74/335 |
| 4,911,031 | 3/1990 | Yoshimura et al. | 74/335 |
| 4,944,194 | 7/1990 | Tanoue et al. | 74/335 |
| 4,945,484 | 7/1990 | Cote et al. | 364/424.1 |

FOREIGN PATENT DOCUMENTS

| | | |
|---|---|---|
| 3443064 | 6/1986 | Fed. Rep. of Germany . |
| 60-011759 | 1/1985 | Japan . |
| 60-222328 | 11/1985 | Japan . |
| 62-278342 | 12/1987 | Japan . |
| 62-278343 | 12/1987 | Japan . |
| 62-288755 | 12/1987 | Japan . |
| 62-288756 | 12/1987 | Japan . |

*Primary Examiner*—Richard Lorence
*Attorney, Agent, or Firm*—Kanesaka & Takeuchi

[57] ABSTRACT

A transmission control system with gear shift failure detection includes a transmission (1), each gear of which is equipped with a synchromesh mechanism (1e); an actuator unit (2) consisting of a shift actuator (2a) for making a gear shift in a shift direction and a select actuator (2b) for making a gear shift in a select direction; a control unit (4) for calculating a target position signal (M) from an amount of pressdown of an accelerator pedal, a vehicle speed, and a set position of a gear selector to control not only the actuator unit so that a gear is set within a target range but also a clutch so that connection or disconnection is made according to an operation of the transmission; a position detector (2f, 2g) provided in each of the shift and select actuators for detecting a position of a piston rod (2c, 2d); a servo cylinder (2a, 2b) in response to a signal from the position detector to position the piston rod at a given position of each gear; a speed detector (4a) in response to a signal from the position detector of the shift actuator to detect an operational speed of the piston rod of the shift actuator; and a decision maker (4b) in response to a signal from the speed detector to decide that a gear shift is faulted if the operation speed is lower than a reference speed for a predetermined time outside a synchromesh mechanism operational range of the transmission.

6 Claims, 9 Drawing Sheets

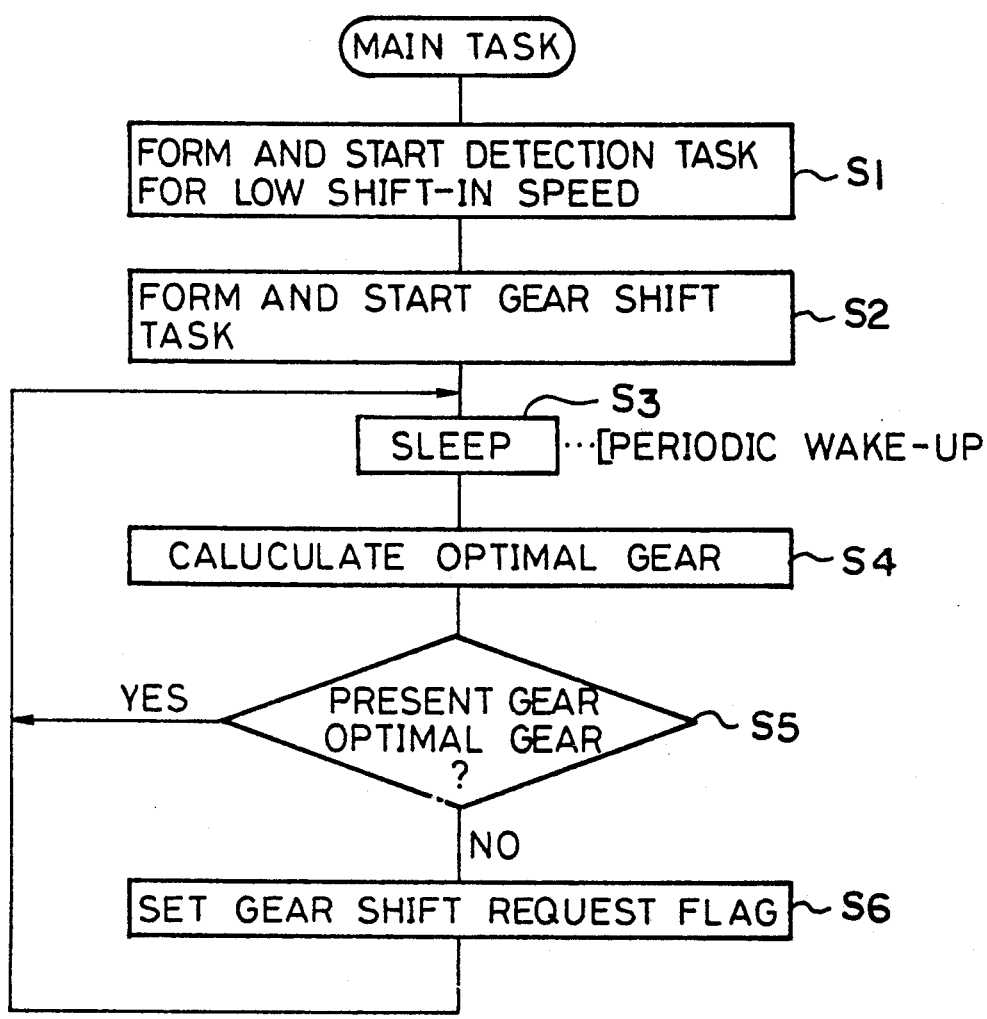

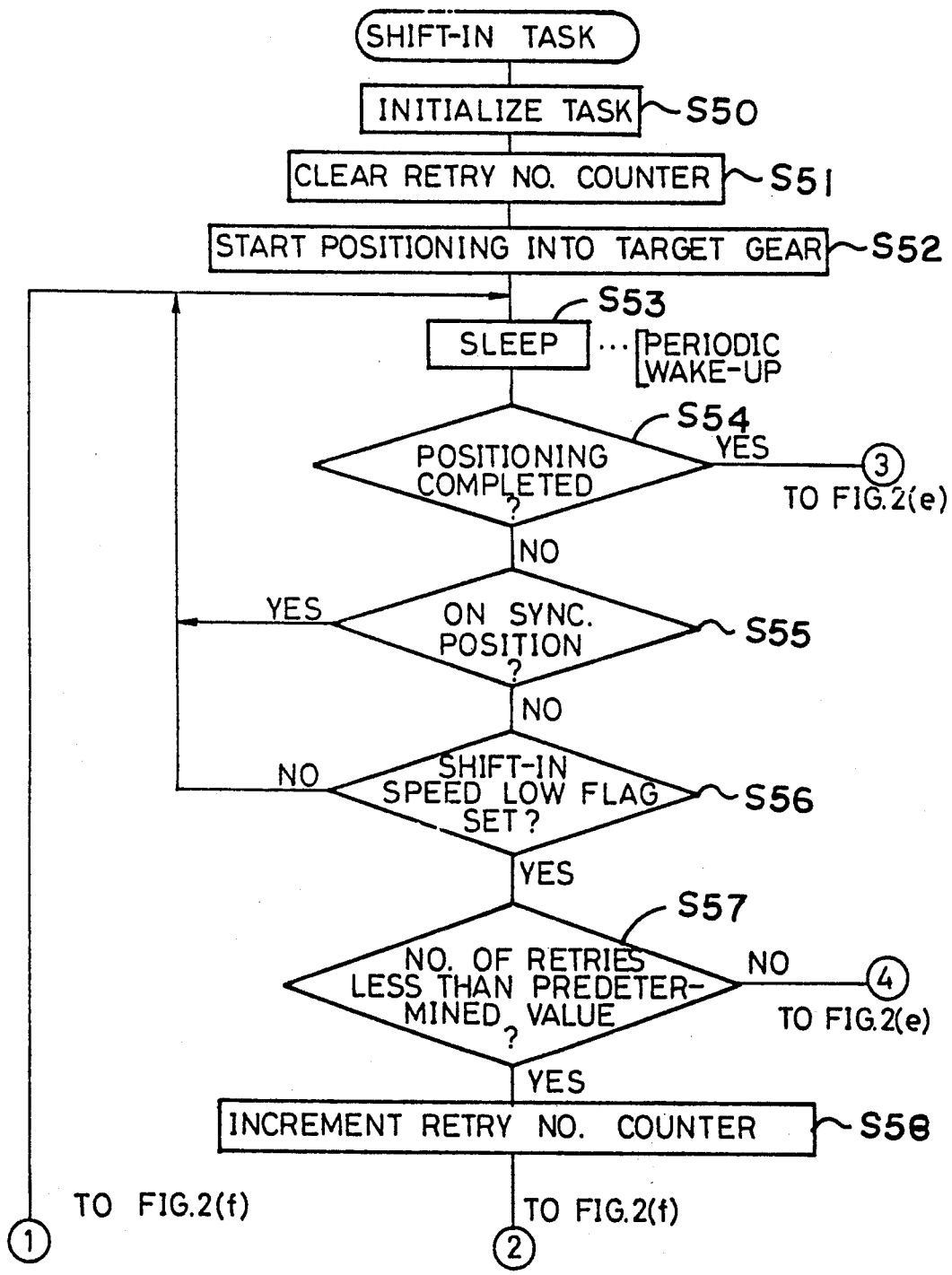

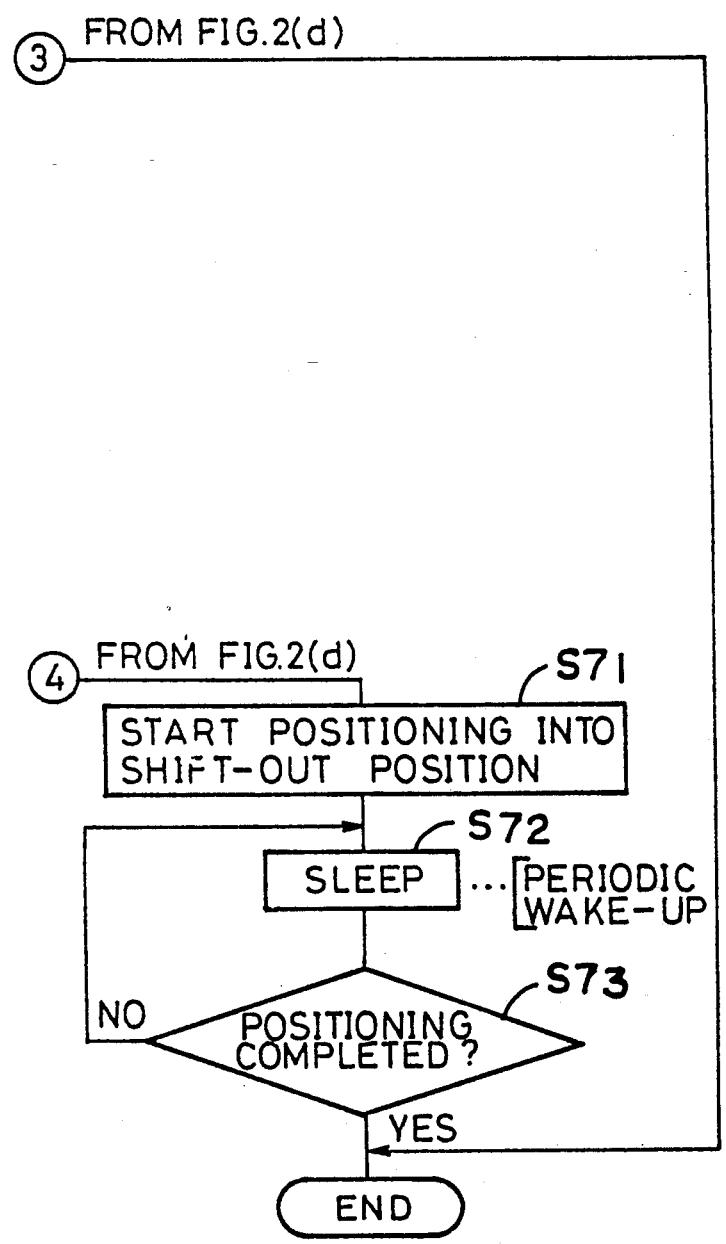

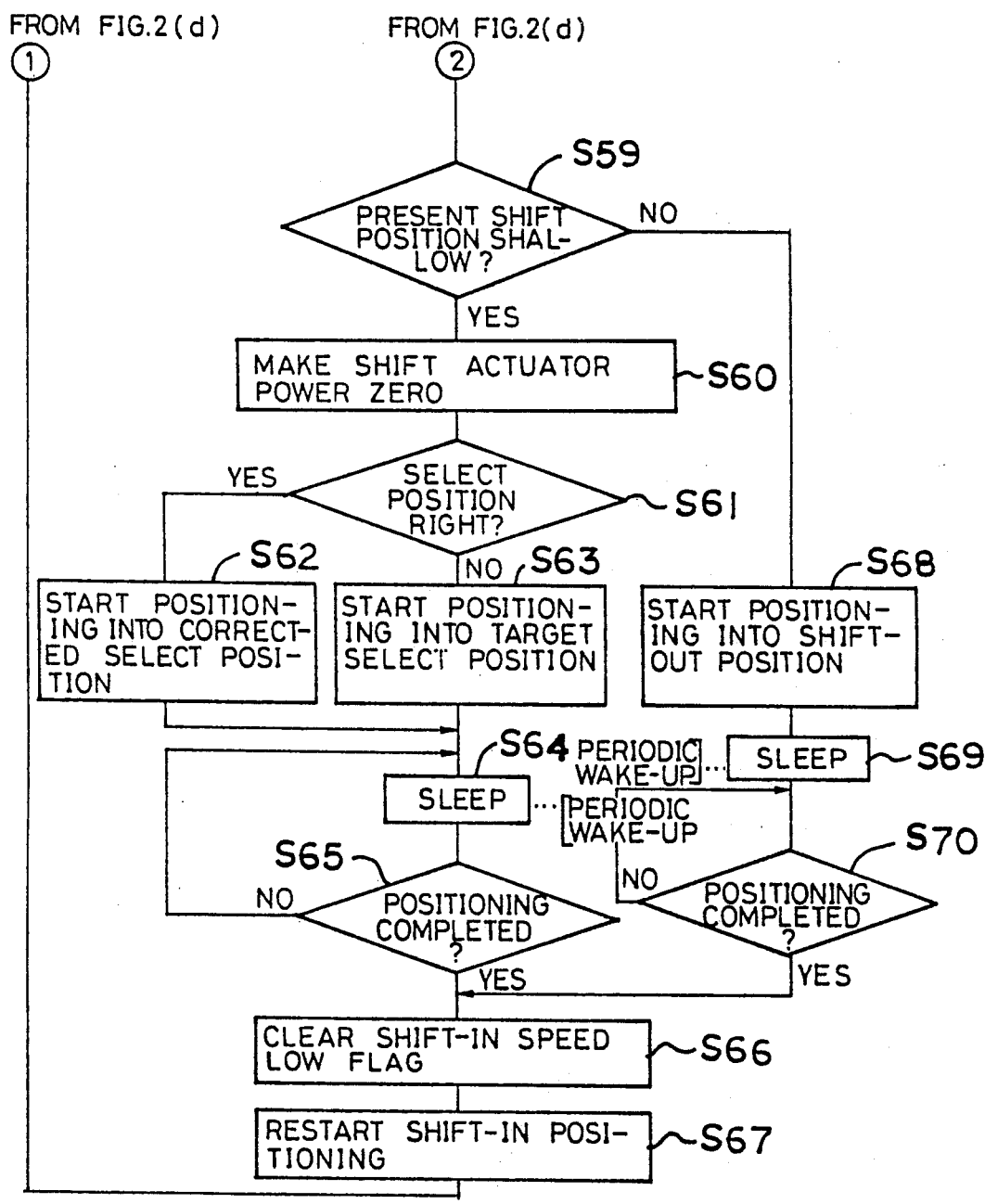

TRANSMISSION CONTROL SYSTEM WITH GEAR SHIFT FAILURE DETECTION

BACKGROUND OF THE INVENTION

1. Field of the Invention

The present invention relates to a transmission control system having a shift actuator and a select actuator to control the transmission and the clutch according to the amount of pressdown of the accelerator pedal and the vehicle speed.

2. Description of the Prior Art

FIG. 3 shows a conventional transmission control system which includes a parallel axis gear type transmission 1; an actuator 2 consisting of a select actuator 2a and a shift actuator 2b to control the transmission I for making a gear shift. Both of the actuators 2a and 2b are driven by a hydraulic drive system 3 which consists of a tank 3a, a pump 3b, and an accumulator 3c. The driving gear of the transmission 1 is controlled by a pair of piston rods 2c and 2d. This control is made by the drive unit 2e, which in turn is controlled by the main control unit 4. A pair of potentiometers 2f and 2g are provided to detect the positions of the piston rods 2c and 2d. The drive unit 2e performs a feedback control so that the actual position signals from the potentiometers 2f and 2g match the target position signal M from the main control unit 4. Consequently, the shift lever 50 drives shift blocks 51-53 to make a gear shift from the neutral "N" to the first gear "1", second gear "2", third gear "3", fourth gear "4", fifth gear "5", or reverse "R" as shown in FIG. 5(a).

A clutch 6 is linked to the piston rod 7a of a clutch actuator 7 for making connection or disconnection. The hydraulic pressure is supplied to the clutch actuator 7 from the hydraulic drive system 3 to make a feedback control by the drive unit 7b so that the actual position signal of the piston rod 7a matches the target position signal C from the main control unit 4. The drive unit 7b is controlled by the main control unit 4. An engine 8 has a control unit 9 which is controlled by the main control unit 4. The rotation of the engine 8 is transmitted to an axle 10 via the clutch 6 and the transmission 1.

The main control unit 4 receives signals from an accelerator pedal sensor 11, a brake pedal sensor 12, a key switch 13, an exhaust brake switch 14, and a selector 15 and a rpm output signal W from a vehicle speed detector 22 which is mounted on an output shaft 1a and controls the drive units 2e and 7b, the control unit 9, a display panel 16, and a control unit 17a which controls a gear position display panel 17. The main control unit 4 multiplies the rpm output signal W from the vehicle speed detector 22 by a constant α which consists of the radius r of wheels 23 and the gear ratio of a differential gear 24 to provide a vehicle speed V. Thus, the main control unit 4 controls the clutch 6 and the transmission 1 in response to the amount of pressdown of the accelerator pedal, the vehicle speed, and the shift position of the selector 15. The fourth and fifth gears "4" and "5" of the selector 15 are automatic transmission modes between first and fourth gears, and second and fifth gears, respectively.

As FIG. 4 shows, the transmission 1 has a synchromesh mechanism le consisting of a synchronizer hub 1f and a cone clutch 1c for preventing gear noise upon gear shift. The synchronizer hub 1f of a sleeve 1d rotatably and slidably mounted on the shaft 1a is pressed to the cone clutch 1c of a gear 1b so that the shaft 1a and the gear 1b are synchronized and connected.

As FIG. 5(a) shows, a gear shift is made by moving the shift lever 50 to the select position with the select actuator 2a and then shifting one of the shift blocks 51-53 in the shift direction with the shift actuator 2b. At this point, the dog clutch 1d is slidably moved on the shaft 1a by the actuators 2a and 2b for engagement with the gear 1b. When the gear 1b and the shaft 1a are connected, the driving power is transmitted via another gear 1m and shaft 1n.

As FIG. 5(b) shows, however, the shift lever 50 can be stuck between the shift blocks 52 and 53, for instance, or the actuator 2a and/or 2b can simply malfunction, failing to make a gear shift. In order to detect this gear shift failure, a variety of measures have been proposed in Japanese Patent Application Kokai Nos. 60-11759, 60-222328, 62-278342, 62-278343, and 62-288755. All of these measures detect the gear shift failure based on the time elapsed since the gear shift operation is started so that it has been impossible to detect the failing conditions such as the position of the failed actuator 2a or 2b. Thus, it has been difficult to provide an appropriate countermeasure. Then, Japanese Patent Application Kokai No. 62-288756 has proposed to detect the operational speed of the actuator to determine that the actuator is faulted when the operational speed is low for a predetermined time and stop the shift operation to the target gear so that the gear shift can be repeated later.

In the above conventional transmission control system, however, the transmission 1 is equipped with the synchromesh mechanism 1e so that the operational speed of the actuator 2b is reduced in the operational range of the synchromesh mechanism 1e with the friction produced by the engagement between the synchronizer hub and the gear. This reduction in the operational speed has often been mistaken as a gear shift failure.

SUMMARY OF THE INVENTION

Accordingly, it is an object of the invention to provide a reliable transmission control system in which the actuator speed outside the synchromesh mechanism operational range is detected to decide whether the actuator is faulted, thereby preventing the low actuator speed within the synchromesh mechanism operational range from being mistaken as a gear shift failure.

According to the invention there is provided a transmission control system which includes an actuator unit consisting of a shift actuator and a select actuator each consisting of a position detector for detecting the position of a piston rod and a servo cylinder responsive to a signal from the position detector to position the piston rod a given gear position of the transmission; a speed detector responsive to a signal from the position detector of the shift actuator to detect the operational speed of the piston rod of the shift actuator; and a decision maker responsive to a signal from the speed detector to decide that the gear shift is a failure if the operational speed is lower than a reference speed for a predetermined time outside the synchromesh mechanism operational range of the transmission during the shift-in operation by the shift actuator.

The above and other objects, features, and advantages of the invention will become more apparent from the following description when taken in conjunction with the accompanying drawings.

BRIEF DESCRIPTION OF THE DRAWINGS

FIG. 2(a) is a flowchart showing the routine of a main task;

FIG. 2(d), (e), and (f) are flowcharts showing the routine of a shift-in task;

DESCRIPTION OF THE PREFERRED EMBODIMENT

Figure 1:
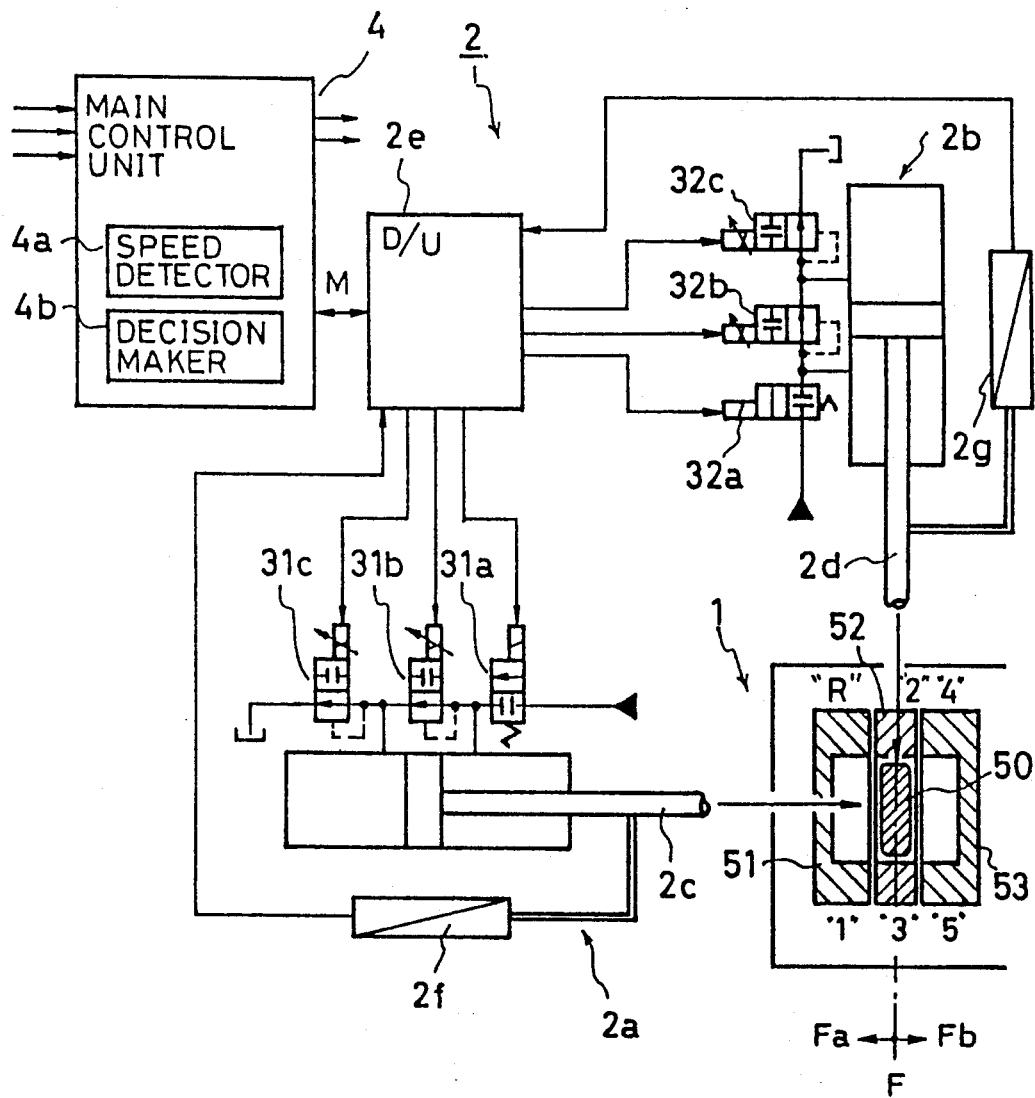
FIG. 1 is a schematic diagram of a transmission control system according to an embodiment of the invention.
Figure 3:
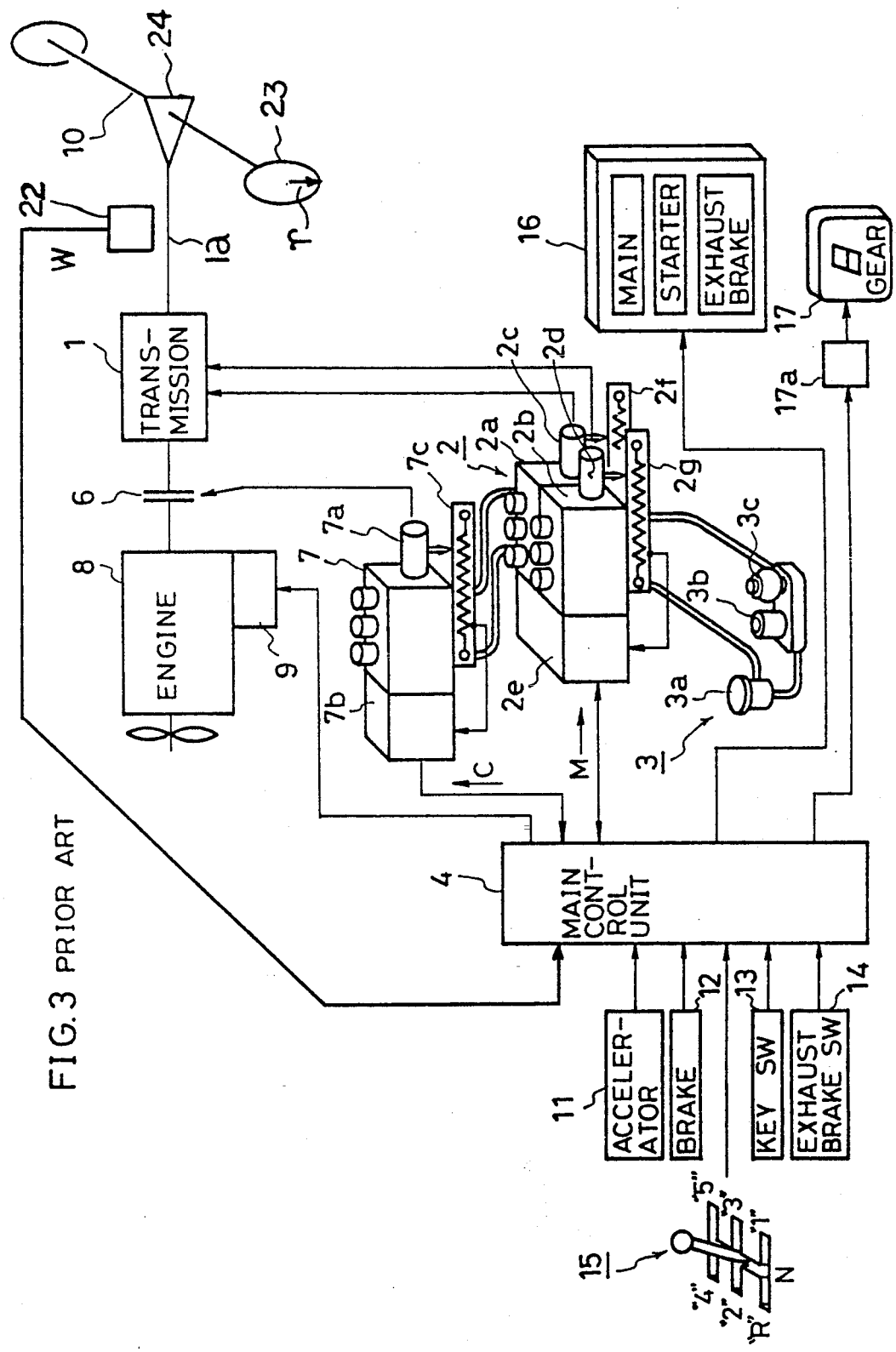
FIG. 3 is a schematic diagram of a conventional transmission control system.
Figure 4:
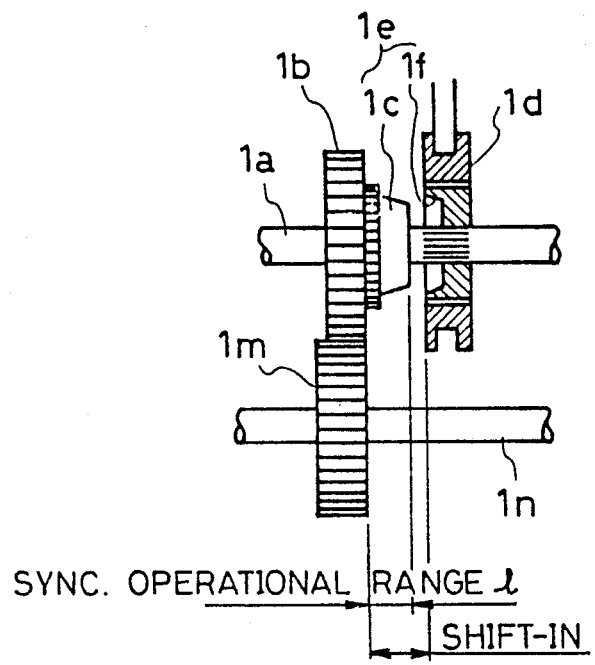
FIG. 4 is a side, partially sectional, view of a synchromesh mechanism of the conventional transmission control system.
Figure 5A:
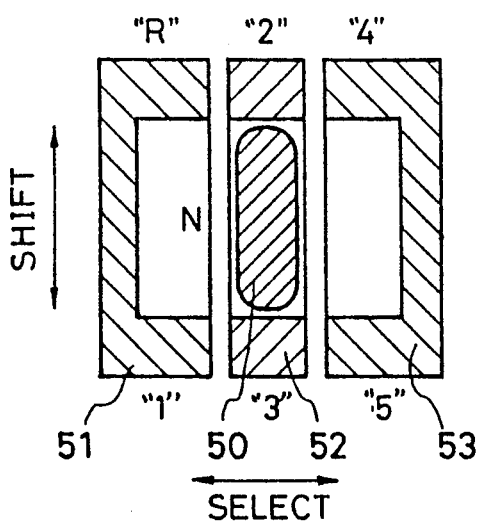
FIGS. 5(a) and 5(b) are sectional views of a shift lever of the conventional transmission control system.

In FIG. 1, like numeral characters denote like or corresponding parts or components of FIGS. 3-5. The shift actuator 2a and the select actuator 2b of an actuator 2 each have a servo cylinder which is able to stop the piston rod 2c or 2d at a given position. These piston rods are mechanically connected to the shift lever 50 of a transmission 1. These actuators 2a and 2b also have hydraulic pressure switching electromagnetic valves 31a-31c and 32a-32c, respectively, for controlling the hydraulic pressure from the hydraulic drive system 3 to stop the piston rods 2c and 2d at a given position. The first hydraulic pressure switching electromagnetic valves 31a and 32a are normally closed two-way valves for conducting the hydraulic pressure from the hydraulic drive system 3, and the second and third hydraulic pressure switching electromagnetic valves 31b and 32b, and 31c and 32c are normally opened two-way valves for moving the piston rods 2c and 2d. The main control unit 4 has a speed detector 4a for detecting the operational speed with the potentiometers 2f and 2g of the respective actuators 2a and 2b and a decision maker 4b for deciding that the gear shift failure has occurred when the operational speed from the speed detector 4a is less than the reference speed for a predetermined time, with the position signal from the potentiometer 2g indicating that the piston rod 2d is outside the synchromesh mechanism operational range.

In operation, as FIGS. 2(a) and (b) show, in response to the output signals from the respective detectors, the main control unit 4 calculates the target gear. If the target gear is different from the present gear, it sets a gear shift requesting flag while outputting a target gear signal M. Then, the drive unit 2e drives the respective actuators 2a and 2b for gear shift so that the actual gear signal matches the target gear signal M. The gear shift is made by shifting the shift lever 50 out of the present gear (shift-out) with the shift actuator 2b, positioning the shift lever 50 at the select position with the shift actuator 2a, and moving one of the shift blocks 51-53 into the gear (shift-in) with the shift actuator 2b.

Figure 2B:
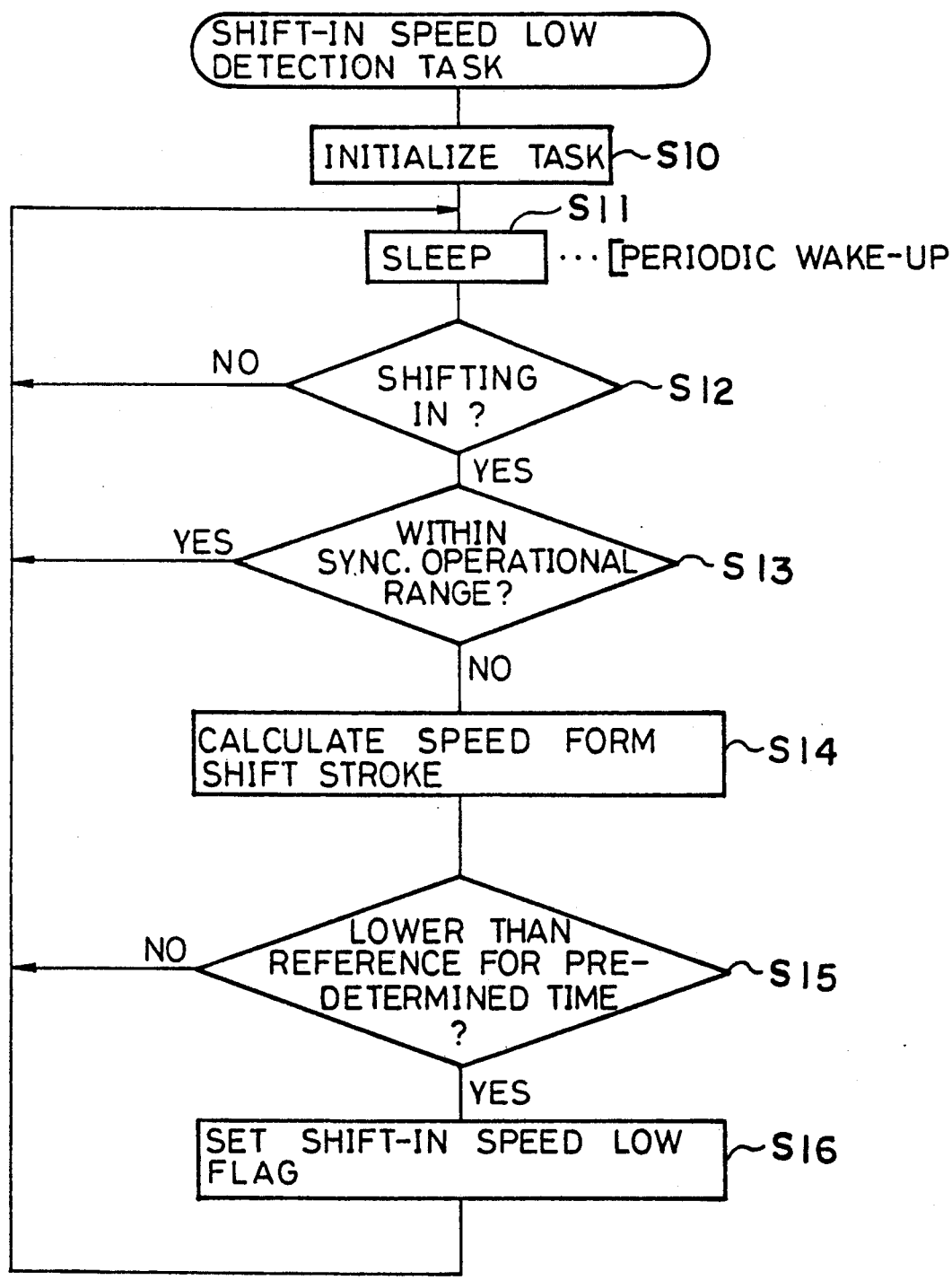
FIG. 2(b) is a flowchart showing the routing of a shift-in speed low detection task.

More specifically, the main task which starts in response to the application of power to the control unit is shown in FIG. 2(a). In Step S1, when the main task is turned on, the shift-in speed low detection task, which will be described below with reference to FIG. 2(b), is started. In Step S2, the gear shift task of FIG. 2(c), which will be described below with reference to FIG. 2(c), is started and, in Step S3, its execution is stopped and, then, it is turned on at predetermined intervals.

In Step S4, the optimal or target gear position is calculated from the output signals of the respective detectors. In Step S5, whether the present gear position is the optimal one is determined. If the result is negative, in Step S6, a gear shift request flag is set, and its execution is stopped. If the result is positive in Step S5, its execution is stopped.

The shift-in speed low detection task which has been started in Step S1 of the main task will be described below in detail with reference to FIG. 2(b). In Step S10, the task is initialized and, in Step S11, its execution is stopped and, then, it is turned on at predetermined intervals. In Step S12, whether the shifting-in operation is under way is determined. If the result is negative, its execution is stopped. If the result is positive, in Step S13, whether the piston rod 2d is in the operational range of the synchromesh mechanism is determined based on the output signal of the potentiometer 2g. If the result is positive, its execution is stopped. If the result is negative, in Step S14, the speed of the piston rod 2d is calculated from the change of shift stroke per unit time. In Step S15, whether the calculated speed is below the predetermined speed and lasts more than the predetermined time is determined. If the result is positive, in Step S16, a low flag indicative of a gear change failure is set, and its execution is stopped. If the result is negative in Step S15, its execution is stopped without performing Step S16.

Figure 2C:
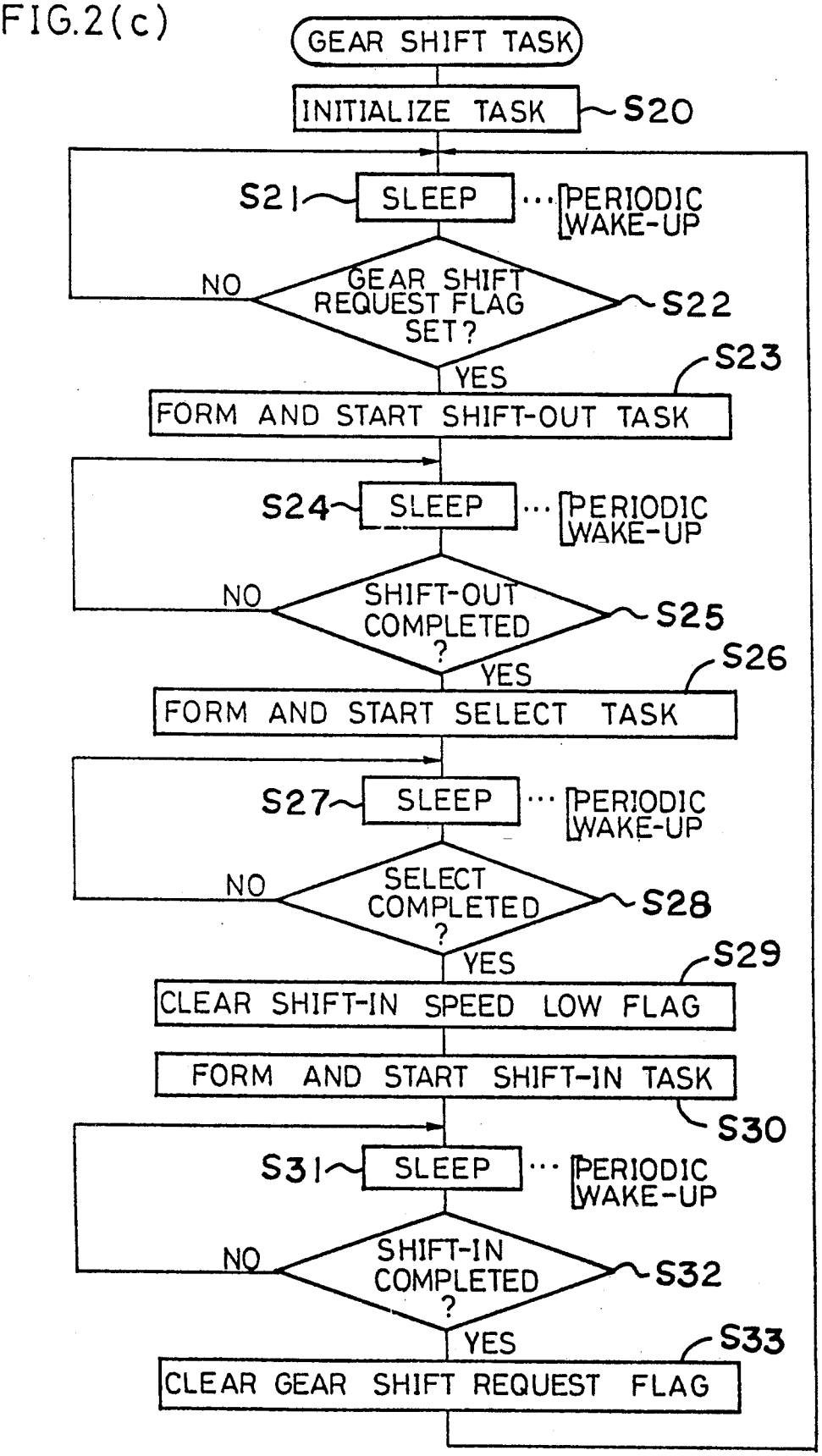
FIG. 2(c) is a flowchart showing the routine of a gear shift task.

Then, as FIGS. 2(c) and (d) show, the speed detector 4a detects the operational speed of the shift actuator 2b during the gear shift based on changes in the shift stroke. If the operational speed of the actuator 2b is less than the reference speed for a predetermined time, the decision maker 4b decides that the gear shift is a failure and sets a shift-in speed low flag. Then, it decides whether the present position of the piston rod 2d is within the synchromesh mechanism operational range 1. If it is, the operation is continued to make a gear shift as usual. If it is outside of the synchromesh mechanism operational range, based on the comparison between the present position signal and the target position signal M, the decision maker decides whether the present position is at a deep position in the shift-in operation. If it is, the shift actuator 2b is shifted out and into the neutral for performing another shift-in operation. Whether the shift-in position is "deep" or "shallow" is decided based on the fact that the difference between the present position and the target position M is greater or smaller than a predetermined level.

In the case of a shallow position, all of the switching electromagnetic valves 32a-32c are turned off so that the hydraulic pressure on the piston rod 2d becomes zero, making the operational power of the shift actuator 2b zero. Then, whether the select position signal is off the target position signal M is decided. If the select position signal is off, the select actuator 2a is positioned so that the select position signal matches the target position signal M for making a shift-in. If the select position signal is on the target position signal M, a predetermined correction is added for making a shift-in.

The gear shift task which has been started in Step S2 of the main task will be described in more detail with reference to FIG. 2(c). In Step S20, the gear shift task is initialized and, in Step S21, its execution is stopped and, then, it is turned on at predetermined intervals. In Step S22, whether the request flag is set in Step S6 of the main task is determined. If the result is positive, in Step S23, a shift-out task is started to remove the present gear position and, in Step S24, its execution is stopped. If the result is negative in Step S22, its execution is stopped.

Then, in Step S25, whether the shift-out is completed is determined. If the result is positive, in Step S26, a select task is started for positioning in the select direction and, in Step S27, its execution is stopped. If the result is negative in Step S25, its execution is stopped.

Then, in Step S28, whether the select positioning is completed is determined. If the result is positive, in Step S29, the low flag is cleared, in Step S30, the shift-in task is started and, in Step S31, its execution is stopped. If the result is negative in Step S28, its execution is stopped. Then, in Step S32, whether the shift-in into the target gear position is completed is determined. If the result is positive, in Step S33, the gear shift request flag set in Step S6 of the main task is cleared, and its execution is stopped. If the result is negative in Step S32, its execution is stopped.

The shift-in task which has been started in Step S30 of the gear shift task will be described below in more detail with reference to FIGS. 2(d) through (f). In Step S50, the task is initialized, in Step S51, the retry number counter is cleared, in Step S52, positioning into the target shift position is stared and, in Step S53, its execution is stopped and, then, it is turned on at predetermined intervals.

Then, in Step S54, whether the shift positioning is completed is determined. If the result is positive, it is stopped. If the result is negative, in Step S55, whether the sleeve 1d is within the synchromesh range is determined. If the result is positive, it is determined that the shift operation is normal, and its execution is stopped. If the result is negative, in Step S56, whether the low flag is set in Step S16 of the set-in speed low detection task is determined. If the result is negative, it is determined that the shift operation is normal, and its execution is stopped.

If the result is positive in Step S56, since the gear shift-in operation is faulty, in Step S57, whether the number of retries is below the predetermined value is determined. The "retry" means redoing the gear shift-in operation and, in Step S58, the retry number counter is incremented. In Step S59, whether the present shift position is shallow with respect to the target position is determined. If the result is positive, in Step S60, the operational force of the shift actuator 2b is made zero. In Step S61, whether the present select position is on the target select position. If the result is negative, in Step S63, the select actuator 2a is started so that the present select position agrees the target select position and, in Step S64, its execution is stopped. If the result is positive in Step S61, it is determined that the target select position itself is wrong, and a predetermined correction is added to the target select position and, in Step S62, the select position is started, and its execution is stopped.

Then, in Step S65, whether the select positioning is completed is determined. If the result is negative, its execution is stopped. In this way, Steps S65 and S64 are repeated until the select positioning is completed. If the result is positive in Step S65, in Step S66, the shift-in speed low flag is cleared and, in Step S67, the shift-in positioning is restarted.

If it is determined in Step S59 that the present shift position is deeper than the target shift position, in Step S68, the shift-out operation is started so that the present shift position agrees the target shift position and, in Step S69, its execution is stopped.

Then, in Step S70, whether the positioning is completed is determined. If the result is negative, its execution is stopped, and Steps S70 and S69 are repeated until the positioning is completed. If the result is positive, in Step S66, the shift-in speed low flag is cleared and, in Step S67, the shift-in positioning is restarted.

If the gear shift-in operation failure is not corrected after a predetermined number of gear shift-in operations, the result in Step S57 becomes negative. Thus, in Step S71, the shift-out operation is started. After the positioning into the shift-out position is completed in Steps S72 and S73, its execution is stopped. Consequently, it is necessary to turned off and on again the power switch to execute the main task program from Step S1 in FIG. 1(a).

Figure 5B:
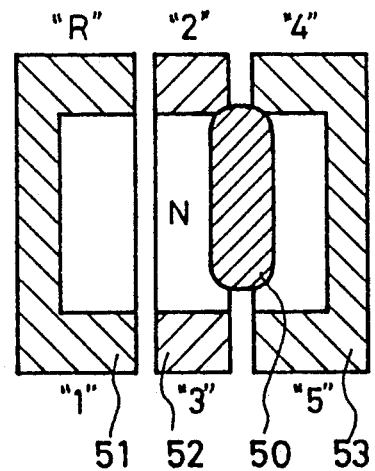

As FIG. 5(b) shows, the shift lever 50 can be stuck between the gear boxes 52 and 53, for instance, to cause a shift failure in the shallow shift-in position. In order to correct this failure, the hydraulic drive system 3 is started again to return the select actuator 2a to the target position F as shown in FIG. 1, and the target position signal M is gradually increased by a predetermined correction increment $\pm\alpha$ so that the target position F is shifted in the direction Fa or Fb into the select position for making correction and shift-in. More specifically, the select position Fa is corrected in the direction Fa by $\alpha$ $(+\alpha)$ for positioning and then shift-in. If the shift-in failed, correction is made in the direction Fb by $\alpha$ $(-\alpha)$ for positioning and shift-in again. If it is still failed, further correction by $\pm\alpha$ from the above corrected position is made for positioning and shift-in. This operation is repeated until the shift-in operation is successful or deep in the position. The operation of each of the above flow charts is repeated at predetermined intervals. Whether the shift lever 50 is stuck in the gear box is determined by detecting the time when the movement of the shift lever 50 is zero because the shift lever 50 cannot move in the select direction under the stuck conditions.

As has been described above, according to the invention, the transmission control system detects the gear position of the shift actuator 2b, and the decision maker 4b decides that the gear shift is faulted by a malfunction of the actuator 2b when the operational speed of the actuator 2b is lower than the reference speed for a predetermined time outside the synchromesh mechanism operational range so that the gear select position is corrected based on the decision, whereby the low speed of the actuator 2b in the synchromesh mechanism is not mistaken as a malfunction, thereby increasing the system reliability.

What is claimed is:

1. A transmission control system with gear shift failure detection, comprising:
   a transmission, each gear of which is equipped with a synchromesh mechanism;
   an actuator unit consisting of a shift actuator for making a gear shift in a shift direction and a select actuator for making a gear shift in a select direction;
   a control unit for calculating a target position signal from an amount of pressdown of an accelerator pedal, a vehicle speed, and a set position of a gear selector to control not only said actuator unit so that a gear is set within a target range but also a clutch so that connection and disconnection is made according to an operation of said transmission;

a position detector provided in each of said shift and select actuators for generating a position signal of a piston rod;

a servo cylinder in response to said position signal from said position detector to position said piston rod at a given position of each gear;

a speed detector in response to said position signal from said position detector of said shift actuator to generate a speed signal indicative of an operational speed of said piston rod of said shift actuator; and a decision maker in response to both said position and speed signals from said position detector and said speed detector to decide that a gear shift is faulted if said operation speed is lower than a reference speed for a predetermined time and if said position signal indicates that said position of said piston rod is outside a synchromesh mechanism operational range of said transmission.

2. The transmission control system of claim 1, wherein said speed detector and said decision maker are incorporated in said control unit.

3. A method of controlling a transmission control system with gear shift failure detection which includes a transmission, each gear of which is equipped with a synchromesh mechanism; an actuator unit consisting of a shift actuator for making a gear shift in a shift direction and a select actuator for making a gear shift in a select direction; a control unit for calculating a target position signal from an amount of pressdown of an accelerator pedal, a vehicle speed, and a set position of a gear selector to control not only said actuator unit so that a gear is set within a target range but also a clutch so that connection or disconnection is made according to an operation of said transmission; a position detector provided in each of said shift and select actuators for detecting a position of a piston rod; a servo cylinder in response to a signal from said position detector to position said piston rod at a given position of each gear; a speed detector in response to a signal from said position detector of said shift actuator to detect an operational speed of said piston rod of said shift actuator; and a decision maker in response to a signal from said speed detector to decide that a gear shift is faulted if said operation speed is lower than a reference speed for a predetermined time outside a synchromesh mechanism operational range of said transmission, which comprises said steps of:

turning off said shift actuator so that a hydraulic pressure on said piston rod becomes zero if said decision maker decides that said shift actuator failed to make a gear shift and if the piston rod is at a relatively shallow shift-in position; or driving said shift actuator into a neutral position if said piston rod is at a relatively deep shift-in position and then making a shift-in operation again.

4. The method of claim 3, which further comprises the steps of:

moving a gear select position of said select actuator from a set position by an increment if said piston rod is at a relatively shallow shift-in position; and driving said shift actuator for making a gear shift.

5. The method of claim 4, which further comprises the step of turning on said shift actuator whenever correction is made from said set gear position for making a shift-in.

6. The method of claim 5, which further comprises the step of deciding that said shift actuator is at a shallow or deep position if a difference between a shift position signal and a target signal is small or large.

* * * * *